Nov. 23, 1965 F. SOLOMON ETAL Re. 25,913

DEFERRED-ACTION BATTERY

Original Filed July 13, 1959

2 Sheets-Sheet 1

INVENTORS:
FRANK SOLOMON
ROBERT F. ENTERS

BY

AGENT Karl F. Ross

DEFERRED-ACTION BATTERY

Original Filed July 13, 1959

INVENTORS:
FRANK SOLOMAN
ROBERT F. ENTERS

BY

AGENT

United States Patent Office

Re. 25,913
Reissued Nov. 23, 1965

25,913
DEFERRED-ACTION BATTERY

Frank Solomon, Lake Success, N.Y., and Robert F. Enters, Hackensack, N.J., assignors to Yardney International Corp., New York, N.Y., a corporation of New York Original No. 3,100,164, dated Aug. 6, 1963, Ser. No. 826,589, July 13, 1959. Application for reissue Dec. 10, 1963, Ser. No. 339,568
2 Claims. (Cl. 136—90)

Matter enclosed in heavy brackets [ ] appears in the original patent but forms no part of this reissue specification; matter printed in italics indicates the additions made by reissue.

The present invention relates to electrochemical batteries of the deferred-action type.

Deferred-action batteries generally comprise a plurality of individual cells, each formed by at least one positive and at least [on] *one* negative electrode in a charged state, in combination with activating mechanism designed to inject liquid electrolyte into the cells in response to extraneous signals. It is desirable that the injection of the electrolyte into the cell assembly be as rapid as possible so that the full power of the battery is available when needed.

When the cells are connected in parallel, instantaneous activation is only a minor problem since the entire electrode assembly can be irrigated through a single channel from a common source. With series-connected cells, on the other hand, care must be taken to avoid the possibility of short circuits by the electrolyte liquor itself. For this reason it has heretofore been the practice to provide each cell of such battery with an individual casing and to fill these casings through respective branch channels from a common manifold. Channel systems for this description tend to be bulky since the passages must be large enough to prevent clogging by dust or loose electrode material.

It is, therefore, an object of the present invention to provide a simplified series battery of the deferred-action type in which the above disadvantages are avoided.

A more specific object of this invention is to provide means for rapidly irrigating an assembly of dry-charged, series-connected cells via a common channel yet in a manner minimizing the flow of discharge current over electrolytic leakage paths between adjoining cells.

A further object of this invention is to provide improved means for venting a cell assembly of the character referred to, so as to expedite the admission of electrolyte liquor into such cell assembly.

The foregoing objects are realized, in accordance with a feature of this invention, by the provision of a stacked cell assembly whose individual cells each consist of a positive electrode, a negative electrode, and an intervening separator of sufficient porosity to absorb an electrolyte liquor introduced edgewise into the separator. The exposed edge portions of the separator layers of the several cells, which terminate at the feed channel for the electrolyte, alternate with strips of a suitably hydrophobic insulating material whose surface is not readily wetted by the electrolyte; these strips shield the incoming liquor from the edges of the cell electrodes and, together with the intervening separator edges, define all or part of the feed channel which in an advantageous embodiment passes centrally [of] *through* the cell assembly.

The interposition of non-wettable zones between the electrolyte inlets impedes, in a passive manner, the formation of a liquid film within the feed channel capable of passing substantial discharge currents between adjoining cells. This action can be supplemented, in accordance with another important feature of the instant invention, by the provision of means for actively breaking up any fluid bridges that may nevertheless have formed in the channel, such means preferably taking the form of a jet of air or other gas injected into the channel immediately after the introduction of the electrolyte liquor. This gas jet, which may be released by the activating signal to exert the necessary driving pressure upon the electrolyte, acts to force liquor into the pores of the separator while simultaneously purging the residual liquor from the feed channel.

The far end of the separator, i.e. the edge opposite the one facing the feed channel, may be exposed to the atmosphere at one or more locations in order to provide, in accordance with still another feature of the invention, vents for the air expelled from the separator pores by the electrolyte.

Since some liquor will unavoidably seep out through these vents at the end of the activation process, it is desirable from the viewpoint of leakage suppression that their area be small compared with the overall surface area of the electrode assembly which, except for the said vents, is encased in a shell of insulating material. Preferably, pursuant to a more specific feature of the invention, the separator layers of the several cells are provided with tabs projecting into the venting holes of the shell so as to provide a continuous outer surface while facilitating the expulsion of air from the interior of the shell.

The negative electrode of one cell and the positive electrode of an adjoining cell may be combined into a single bipolar plate member, thereby further increasing the compactness of the assembly. Such bipolar member may comprise a highly conductive backing plate, e.g. of silver or copper, to whose opposite faces the respective active materials are applied by some suitable process, e.g. by spraying, sintering, or electrodeposition. Reference in this connection may be made to co-pending application Ser. No. 825,842, *now abandoned*, filed on July 8, 1959, by Kenneth N. Brown and Otto Wagner, in which a process for the electrolytic production of a bipolar electrode has been disclosed and claimed.

The above and other objects, features and advantages of this invention will become more fully apparent from the following detailed description of certain embodiments, reference being made to the accompanying drawing in which.

Figure 2:
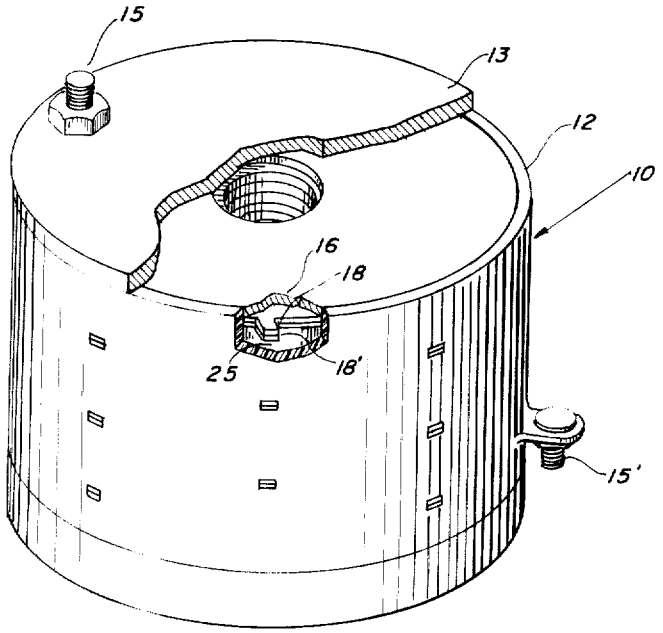
FIG. 2 is a perspective view (parts broken away) of the battery assembly of FIG. 1.
Figure 1:
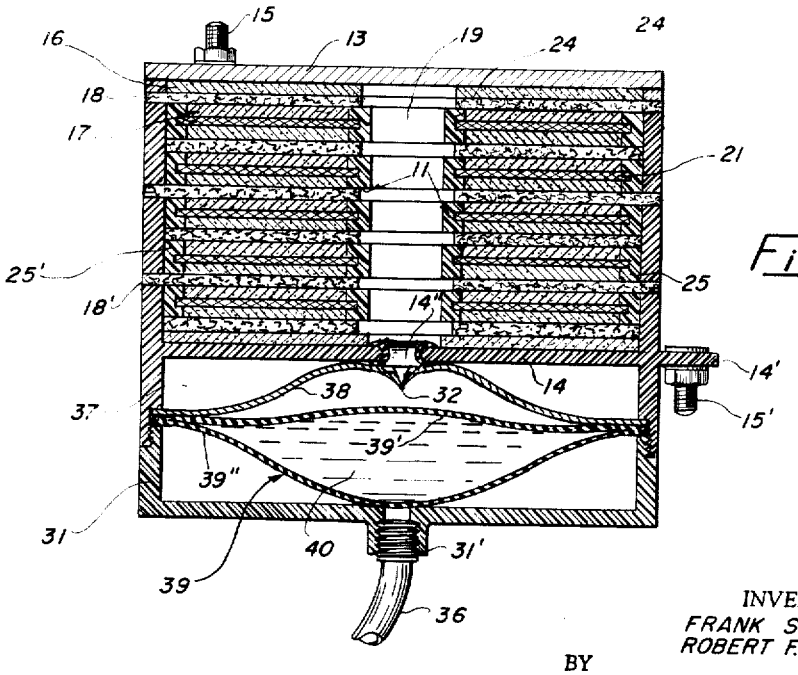
FIG. 1 is a section through a battery assembly according to this invention.

As shown in FIGS. 1 and 2, a battery 10 comprises a cylindrical insulating shell 12 of suitable potting material, such as an epoxy resin, which is sealed at its ends by a pair of metal elements 13 and 14 and surrounds a cell assembly 11. The cell assembly 11 consists of a plurality of positive electrodes 16, a like number of negative electrodes 17, and interelectrode separators 18 interposed therebetween. Each of these elements 16, 17, 18 is in the shape of a thin circular wafer with a centrally located orifice which forms part of a feed channel 19. The electrodes 16, 17 are combined in pairs into bipolar elements by being bonded, as by electro-deposition, onto respective faces of a common support 21 of highly conductive material such as copper or silver. Among the positively charged materials useful to form the electrode layers 16 there may be mentioned silver oxide or peroxide, copper oxide, nickel oxide or lead peroxide. The negative layers 17 may include zinc, cadmium, lead or magnesium. The concentric edges of each bipolar cell unit 16, 17, 21 are encased by washers 24 and 25 of electrolyte-repellent material.

The electrolyte for the electrochemical couples listed above may be alkaline or acidic and, with silver-zinc or silver-cadmium couples, may consist of sodium, potassium or lithium hydroxide, with or without special-purpose additives. The washer elements 24 and 25 may be made of fluocarbon resins or epoxy resins.

The interelectrode separator 18 consists of a porous insulating material having capillary attractions for the electrolyte. Suitable materials for such separator include cellulosic felts, wettable synthetic fibers and glass wools, or combination thereof.

The inner circular edge of each separator layer 18 projects towards channel 19 between adjacent washers 24. The outer circular edge of each separator, projecting between washers 25, rests against the inner wall of shell 12, except at isolated locations where this shell is provided with apertures to accommodate tabs 18' which are integral extensions of the separator layer and project outwardly through these apertures towards the atmosphere. The entire stacked cell assembly is packed tightly inside the casing 12, 13, 14 so as to be under some initial pressure even prior to the introduction of the electrolyte.

The lower end element 14 is in the form of an inverted cup, defining a compartment 37, and is provided with an external lug 14' to which the terminal 15' is attached. Feed channel 19 communicates with compartment 37 through a hole 14'' in end element 14, a guard plate 38 extending outwardly from hole 14'' to form an abutment for a bladder 39 which contains a charge of electrolyte 40. This bladder 39 is clamped in place between an inner shoulder on cup 14 and a cover member 31 which closes the compartment 37. The cover 31 is provided with an apertured boss 31' connected to a source of compressed gas (not shown) via a tube 36. Opposite the outlet of this tube, at the orifice 14'', there is provided a point 32 adapted to pierce the bladder 39 when the latter is deflected from its normal, illustrated position by the pressure of gas admitted through tube 36; it will be understood that the upper wall 39' of bladder 39 is stretched taut enough across the width of compartment 37 so as not to be deflected towards point 32 by impact or gravity during normal handling of the battery assembly.

In operation, the battery is activated by the entrance of the compressed gas into the compartment 37 by way of tube 36, this gas having been released from its container by a suitable electrical or mechanical activating device (not shown) responsive to an extraneous signal. The gas, pressing upon the bladder 39, first causes the upper bladder wall 39' to flex against point 32 so as to be ruptured thereby. This causes the liquid 40 to be expelled and driven, by the continuing gas pressure, into the feed channel 19 where it is virtually instaneously absorbed into the pores of the separator layers 18. The air previously entrapped in these pores and in channel 19 is driven out, ahead of the liquid, through the apertures in shell 12 occupied by the separator extensions 18'. As the plate 38 guides the final quantity of the electrolyte through the orifice 14'', the lower bladder wall 39'' approaches the point 32 and is finally also ruptured thereby, thus enabling the gas from tube 36 to sweep into the channel 19 and to clear the channel walls of any adherent electrolyte particles. Naturally, the gas supply should be so regulated at this point that the gas pressure drops to a level insufficient to drive the electrolyte out of the shell assembly by way of the separator tabs 18'; some liquid may, neverthless, emerge at these separator extensions and form leakage paths between different cell separators without, however, seriously affecting the operation of the battery since the conductivity of these leakage paths will necessarily be extremely limited.

Figure 4:
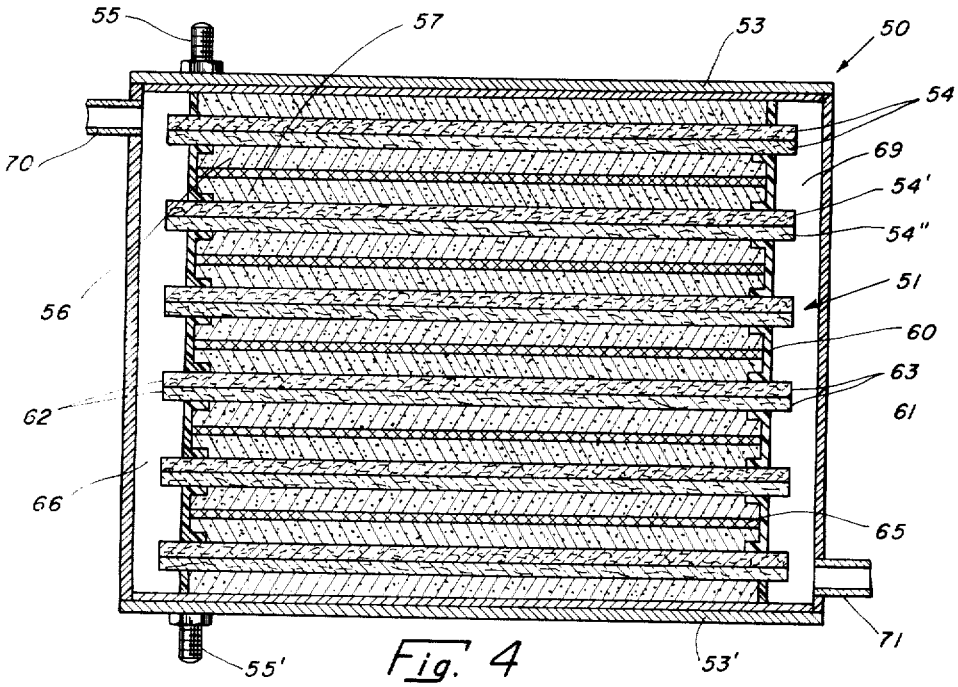
FIG. 4 is a sectional elevation taken on line 4—4 of FIG. 3.
Figure 3:
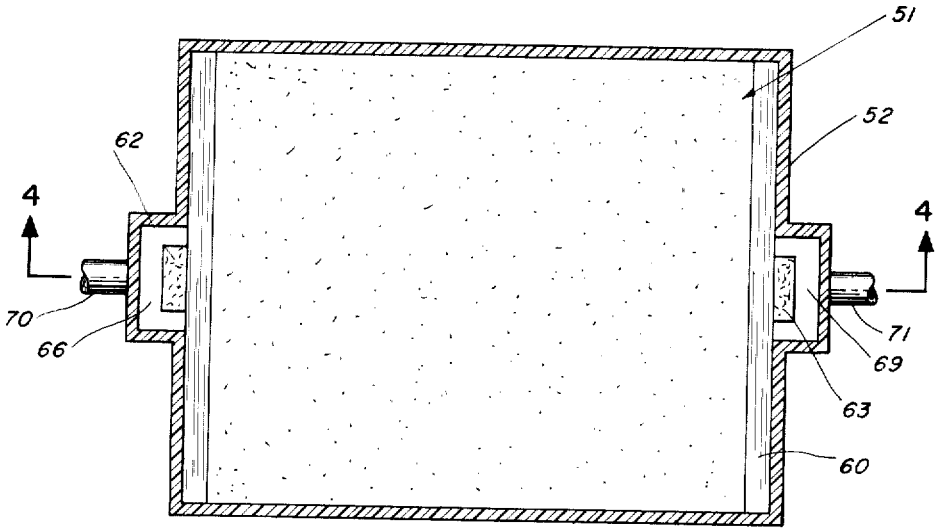
FIG. 3 is a sectional top view of a modified battery assembly according to this invention.

FIGS. 3 and 4 illustrate a battery 50 differing from battery 10 of FIGS. 1 and 2 by being prismatic rather than cylindric. Positive electrodes 56, negative electrodes 57 and separators 54 are arranged in the previously described manner to form an assembly 51 consisting of a plurality of series-connected unit cells. Assembly 51 is maintained under some initial pressure in a casing 52 whose top and bottom plates 53, 53' carry terminals 55, 55'. Casing 52 may again consist of a potting resin or other suitable insulating material.

At opposite locations, preferably along the minor sides of the rectangular cross section of the battery assembly 50, the casing 52 is recessed to form narrow vertical channels 66, 69 around limited peripheral portions of the cell assembly 51. As is clearly shown in FIG. 4, washers 60 of electrolyte-repellent material shield the electrodes 56, 57 and their supporting plates 65 throughout the minor sides of the rectangle and in particular in the region of channels 66 and 69. Between these washers 60, tabs 62, 63, project from the separators 54 into the channels 66, 69. An inlet tube 70 at channel 66 serves for the admission of an electrolyte, followed by a stream of flushing gas, in order to saturate the separators 54 with liquid in the manner previously described, the liquid being taken up by the tabs 62 while the air expelled from the interstices of the separator escapes through the tabs 63 into the channel 69 and vents through an outlet 71 into the atmosphere. The activating procedure is thus essentially the same as in the preceding embodiment.

The separator 54 has been shown composed of two layers 54', 54'' of which the layer 54' lies next to the negative electrode 57 and advantageously consists of absorbent paper whereas the layer 54'' is made of a more porous material such as glass wool. This combination insures rapid penetration of the separator by the electrolyte liquor while sufficiently preventing any galvanic contact between adjacent electrodes of opposite polarities. It will be understood that the presence of the hydrophobic washers 60 prevents the formation of objectionable leakage paths in either the feed channel 66 or the venting channel 69.

From the foregoing disclosure it will be apparent that there has been provided an improved mechanism as well as a novel process for activating a dry-charged battery by inroduction of a liquid electrolyte into a feed channel, absorption of the electrolyte from such channel by wick-like elements, e.g. separators, in the various battery cells, and subsequent flushing of the feed channel by a gas stream. The invention is, of course, not [limited] *limited* to the specific embodiments described and illustrated but may be realized in various modifications and adaptations without departure from the spirit and scope of the appended claims.

We claim:

*1.* An electrochemical battery of the deferred-action type, comprising a housing [,]; a plurality of stacked dry-charged bipolar silver-zinc electrodes in series in said housing each separated from an adjacent *bipolar* electrode by an electrolyte-absorbing separator, a plurality of vents in said housing *respectively* disposed adjacent said electrolyte-absorbing separators [,]; a centrally disposed feed channel for the admission of liquid electrolyte into *the* electrolyte-absorbing separators, said electrolyte-[absorbent] *absorbing* separators terminating at said feed channel and *being* adapted to draw electrolyte from said feed channel [, and]; electrolyte-repelling spacer means bounding said feed channel between said electrolyte-absorbing [spacers] *separators* and encompassing said bipolar electrodes whereby electrolyte is prevented from electrically connecting the component electrodes of said bipolar electrode [,] *along said feed channel;* a rupturable liquid-electrolyte-containing reservoir disposed adjacent *the* [said] *stack* of electrodes [,]; cutting means disposed adjacent said rupturable reservoir and adapted to rupture the same, and means for applying gas pressure to said reservoir to bring the same into cutting contact with said cutting means whereby the electrolye is released from said reservoir and is forced into said centrally disposed feed channel.

*2. An electrochemical battery of the deferred-action type, comprising a housing; a plurality of stacked dry-charged bipolar electrodes in series in said housing each separated from an adjacent bipolar electrode by an electro-*

*lyte-absorbing separator, the positive material of said electrode being silver and the negative material thereof being selected from the group which consists of zinc and cadmium; a centrally disposed feed channel for the admission of liquid electrolyte into the electrolyte-absorbing separators, said electrolyte-absorbing separators terminating at said feed channel and being adapted to draw electrolyte from said feed channel; electrolyte-repelling spacer means bounding said feed channel between said electrolyte-absorbing separators and encompassing said bipolar electrodes whereby electrolyte is prevented from electrically connecting the component electrodes of said bipolar electrode; a rupturable liquid-electrolyte-containing reservoir disposed adjacent the stack of electrodes; cutting means disposed adjacent said rupturable reservoir and adapted to rupture the same, and means for applying gas pressure to said reservoir to bring the same into cutting contact with said cutting means whereby the electrolyte is released from said reservoir and is forced into said centrally disposed feed channel; and venting means in said housing open toward said separators at locations opposite said feed channel for permitting the escape of air from said separators as said electrolyte is supplied thereto.*

References Cited by the Examiner

The following references, cited by the Examiner, are of record in the patented file of this patent or the original patent.

UNITED STATES PATENTS

| | | | |
|---|---|---|---|
| 690,770 | 1/1902 | Reed et al. | 136—87 |
| 2,594,879 | 4/1952 | Davis | 136—90 |
| 2,639,306 | 5/1953 | Fishbach | 136—112 |
| 2,751,428 | 6/1956 | Depoix | 136—111 |
| 2,798,111 | 7/1957 | Renke | 136—90 |
| 2,847,494 | 8/1958 | Jeannin | 136—90 |
| 2,852,592 | 9/1958 | Salauze | 136—90 |
| 2,886,621 | 5/1959 | Henman | 136—90 |
| 2,988,587 | 6/1961 | Haring | 136—90 |

FOREIGN PATENTS

| | | |
|---|---|---|
| 1,093,523 | 5/1956 | France. |

WINSTON A. DOUGLAS, *Primary Examiner.*

MURRAY TILLMAN, JOHN H. MACK, *Examiners.*